United States Patent
Stueven et al.

(10) Patent No.: US 8,349,946 B2
(45) Date of Patent: *Jan. 8, 2013

(54) PRODUCTION OF A WATER-ABSORBING RESIN TO WHICH A PARTICULATE ADDITIVE IS ADMIXED

(75) Inventors: Uwe Stueven, Bad Soden (DE); Rüdiger Funk, Niedernhausen (DE); Matthias Weismantel, Jossgrund-Oberndorf (DE); Thomas Daniel, Waldsee (DE); Annemarie Hillebrecht, Künzell (DE); Dominicus van Esbroeck, Nanjing (CN); Karl J. Possemiers, Gravenwezel (BE)

(73) Assignee: BASF SE, Ludwigshafen (DE)

( * ) Notice: Subject to any disclaimer, the term of this patent is extended or adjusted under 35 U.S.C. 154(b) by 216 days.

This patent is subject to a terminal disclaimer.

(21) Appl. No.: 12/861,338

(22) Filed: Aug. 23, 2010

(65) Prior Publication Data

US 2010/0324212 A1 Dec. 23, 2010

Related U.S. Application Data

(63) Continuation of application No. 12/158,502, filed as application No. PCT/EP2006/070250 on Dec. 28, 2006, now Pat. No. 7,786,211.

(30) Foreign Application Priority Data

Dec. 29, 2005 (DE) .......................... 10 2005 062 929

(51) Int. Cl.
*C08G 18/63* (2006.01)
(52) U.S. Cl. ........ 524/700; 524/779; 524/780; 524/787; 524/789
(58) Field of Classification Search ................. 524/700, 524/779, 780, 787, 789
See application file for complete search history.

(56) References Cited

U.S. PATENT DOCUMENTS 5,455,284 A 10/1995 Dahmen et al.

FOREIGN PATENT DOCUMENTS

| | | |
|---|---|---|
| EP | 0 496 594 | 7/1992 |
| EP | 513 780 | 11/1992 |
| EP | 0 692 514 | 1/1996 |
| EP | 0 940 148 | 9/1999 |
| EP | 01426402 | 6/2004 |
| WO | WO-03/022896 | 3/2003 |

*Primary Examiner* — Edward Cain
(74) *Attorney, Agent, or Firm* — Marshall, Gerstein & Borun LLP

(57) ABSTRACT

The invention relates to a process for producing a water-absorbing resin by polymerization of a reaction mixture comprising at least one hydrophilic monomer and, if appropriate, at least one crosslinker in a reactor, which comprises admixing the reaction mixture with at least one first portion of a particulate additive before the reaction mixture has reached a residence time of 40% of the overall residence time in the reactor and with at least one second portion of a particulate additive when the reaction mixture has reached a residence time of 45% or more of the overall residence time in the reactor, the additive being selected from water-absorbing resin powders, fillers and mixtures thereof, the total solids content of monomer and additive being in the range from 30% to 60% by weight, the amount of additive being in the range from 5% to 50% by weight, based on the monomers, and the weight ratio of the first portion to the second portion of the additive being in the range from 10:1 to 1:5. The resin powder is recycled fine-sized material for example. Not only the residual monomer content, specifically the residual crosslinker content, but also the level of extractables in the water-absorbing resin are reduced by the method of addition described. A high fraction of additives can be incorporated without the properties of the water-absorbing resin obtained being adversely affected. The additives enter a sufficiently firm bond with the resin, so that no excessive dusting occurs on exposure to mechanical stress.

15 Claims, 1 Drawing Sheet

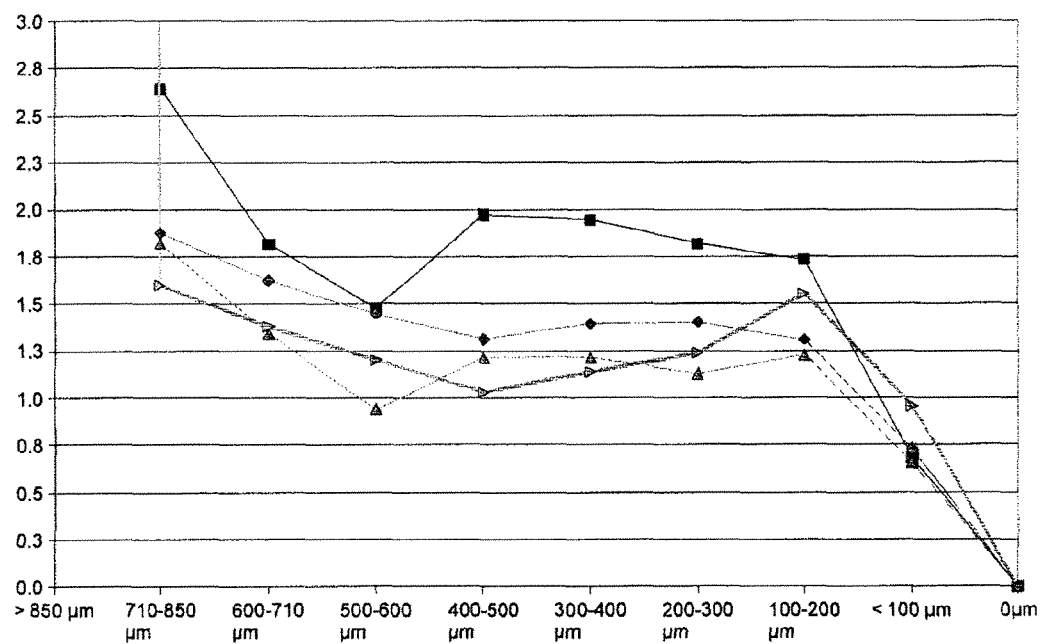

PRODUCTION OF A WATER-ABSORBING RESIN TO WHICH A PARTICULATE ADDITIVE IS ADMIXED

CROSS-REFERENCE TO RELATED APPLICATIONS

This is a continuation of U.S. patent application Ser. No. 12/158,502, filed Jun. 20, 2008, incorporated herein by reference in its entirety, now U.S. Pat. No. 7,786,211, which is the U.S. national phase application of International Application No. PCT/EP2006/070250, filed Dec. 28, 2006, which claims the benefit of Geman Patent Application No. 10 2005 062 929.6, filed Dec. 29, 2005.

The present invention relates to the production of a water-absorbing resin by polymerization of a reaction mixture comprising at least one hydrophilic monomer and, if appropriate, at least one crosslinker wherein the reaction mixture is admixed with a particulate additive.

Water-absorbing resins (also referred to hereinbelow as "hydrogel-forming polymers" or as "superabsorbent polymers" (superabsorbents, SAPs)) are capable of absorbing and hence binding aqueous fluids by forming a hydrogel. They therefore find use particularly in hygiene articles such as diapers, incontinence pads and briefs, sanitary napkins and the like to absorb aqueous body fluids. A comprehensive overview of superabsorbents, their use and their production is given by F. L. Buchholz and A. T. Graham (editors) in "Modern Superabsorbent Polymer Technology", Wiley-VCH, New York, 1998.

Water-absorbing resins are obtained by polymerization of at least one hydrophilic monomer, particularly acrylic acid and/or its salts. Their process of production is such that the polymers generally comprise a certain amount of volatile or elutable constituents, especially unconverted, residual monomers and also water-soluble extractable components.

Water-absorbing resins to be used in hygiene articles shall in principle have low levels of volatile and elutable materials. In addition, even very small amounts of extractables have an adverse effect on absorptive performance. Furthermore, a reduction in these constituents is desirable from an ecological viewpoint.

There are prior art methods whereby fines generated in the course of the SAP manufacturing process are recycled back into the ongoing process. The fines are generally hydrogel-forming polymeric particles less than 300 µm and usually less than 100 µm in size, which cannot be used in the production of absorbent cores for hygiene articles because of their small size, since they lead to metering difficulties and dusting and also have a diminished swelling capacity. Fine fractions in water-absorbing resins lead to products of reduced swelling capacity, which is caused by the phenomenon known as gel blocking, i.e., the formation on the particle surface of a rapidly swollen barrier layer which blocks any transportation of fluid into the interior of the particles. This is why polymeric fines of low particle size are sifted off and ideally recycled into the manufacturing process. The recycled material is admixed at one point only in existing recycling methods.

EP-A 513 780 (DOW) describes a process for recycling dry aqueous fluid absorbent polymer fines into the monomer solution comprising the steps of: recovering the fines from the dried and sieved polymer, mixing the fines into the monomer solution and polymerizing the mixture of fines and monomer. The recovered fines have particle sizes of less than 200 µm. The amount of admixed fines is up to 30% by weight, based on the solids content of the polymer.

WO 03/022896 (DOW) mentions the possibility of recycling fines into a continuous polymerization process taking place in a reactor system having at least 3 reaction zones. The 3 zones comprise an initiation zone, a gel phase zone and a granulation zone. The fines are said to be recycled by introducing them into the initiation zone (page 9 lines 6 to 7).

DE 4 021 847 (STOCKHAUSEN) describes a process for producing water-swellable products using very fine fractions of water-swellable polymers by the very fine fractions being dispersed in a room temperature liquid monomer that does not swell the very fine polymeric fractions and polymerized by addition of catalysts and/or irradiation with light, subsequently comminuted and dried.

EP 496594 (NIPPON SHOKUBAI) has fines being incorporated into polymer gel and comminuted in a kneader. 100 parts by weight of a polymer gel are mixed with 1-50 parts by weight of a finely divided hydrogel-forming polymeric powder by means of a kneader in which the hydrated gel is finely divided by shearing force. EP 01 426 402 (NIPPON SHOKUBAI) describes the recycling of removed particulate hydrogel-forming material into the process step of grinding and/or surface aftertreatment. The possibility of reintroducing particulate hydrogel-forming material into the ongoing or another manufacturing process is also explicitly mentioned.

There are various reasons why the incorporation of particulate fillers, such as inorganic particles, in water-absorbing resins is sensible, for example to improve gel stability to thereby facilitate liquid permeation. Fillers can also be used to control the density and/or the volume of the water-absorbing resins.

Now, the danger with the incorporation of particulate additives, such as hydrogel-forming fines or fillers, is that the additives will only enter a loose bond with the resin and form fragile agglomerates which when subjected to a mechanical stress as in being transferred from one container to the other, for example, will break and cause dusting. It is desirable that the additives enter a sufficiently firm bond with the resin so that no excessive dusting occurs in comminuting or transferring operations.

The present invention has for its object to provide a process for producing a water-absorbing resin having a low level of residual monomers, specifically of residual crosslinker. The present invention further has for its object to provide a process for producing a water-absorbing resin by recycling fines without the recycling of fines having an adverse effect on the properties of the water-absorbing resin obtained.

The present invention yet further has for its object to provide a process for producing a water-absorbing resin whereby additives can be incorporated in the resin and the additives enter a sufficiently firm bond with the resin so that no excessive dusting occurs on being subjected to a mechanical stress.

We have found that, surprisingly, not only the residual monomer content, specifically the residual crosslinker content, but also the level of extractables are significantly reduced when a resin powder, for example recycled fines, is included in the monomer solution and the polymerizing reaction mixture concurrently at two different places. We have also found that a high fraction of fines can be incorporated in this way without the properties of the water-absorbing resin obtained being adversely affected.

We have further found that, surprisingly, the specified addition of the resin powder at two different locations gives a distinctly improved and more homogeneous gel structure, leading to a distinct reduction in undesirable gel clumps, i.e., gel particles more than 10 mm in size.

We have further found that a sufficiently firm bond of added additives with the resin is obtainable by adding the additives concurrently at two different locations to the monomer solution or the polymerizing reaction mixture.

The present invention accordingly provides a process for producing a water-absorbing resin by polymerization of a reaction mixture comprising at least one hydrophilic monomer and, if appropriate, at least one crosslinker in a reactor, which comprises admixing the reaction mixture with at least one first portion of a particulate additive before the reaction mixture has reached a residence time of 40% of the overall residence time in the reactor and with at least one second portion of a particulate additive when the reaction mixture has reached a residence time of 45% or more of the overall residence time in the reactor, the additive being selected from water-absorbing resin powders, fillers and mixtures thereof, the total solids content of monomer and additive being in the range from 30% to 60% by weight, the amount of additive being in the range from 5% to 50% by weight, based on the monomers, and the weight ratio of the first portion to the second portion of additive being in the range from 10:1 to 1:5.

Preferably, the first portion of the additive is admixed when the reaction mixture has reached a residence time of up to 30%, in particular in the range from 15% to 30%, of the overall residence time in the reactor. Preferably, the second portion of the additive is admixed when the reaction mixture has reached a residence time in the range from 50 to 99%, in particular from 50% to 80%, of the overall residence time in the reactor. The first portion can also be mixed into a monomer solution before the addition of a free radical initiator.

During the polymerization, the reaction mixture traverses several stages. At the beginning there is a comparatively watery solution of monomer. After initiation of the polymerization, the viscosity of the mixture increases with increasing degree of polymerization. As the reaction progresses, the highly viscous gel crumbles apart into free-flowing granules.

The concentration of hydrophilic monomers and crosslinker in the aqueous monomer solution is in the range from 15% to 50% by weight for example. The aqueous monomer solution may comprise a suitable grafting base. The total solids content is the proportion of the total mass of the reaction mixture that is attributable to dry matter. Dry matter comprises monomers (and polymer formed therefrom) and additive.

Between the additions of the first and second portions of the additive, the conversion of the reaction mixture progresses by preferably at least 15 mol %, in particular 30 mol %, reckoned as conversion at addition of the second portion minus conversion at addition of the first portion. Conversion refers to the conversion of the monomers used.

The "first and second portions" of a particulate additive referred to in the application need not be of an identical material, and the two portions may differ in chemical composition, particle size distribution, moisture content. Observations concerning preferred additives apply independently to the first and second portions. The addition of the "first and/or second portion" may in turn be subdivided into a plurality of individual doses; all that matters is that the totality of the additive added to the reaction mixture, while the mixture is within a certain residence time window, shall meet the conditions specified above.

The particulate additive can be added as such, i.e., as powder or in the form of a suspension, preferably an aqueous suspension.

The resin powder may be particulate hydrogel-forming polymeric material from ongoing production, or material from a different manufacturing process. The resin powder may be a hydrogel without any postcrosslinking whatsoever, or a surface-postcrosslinked material or mixtures thereof.

When a mixture of non-surface-postcrosslinked hydrogel and surface-postcrosslinked hydrogel is used as resin powder, the non-surface-postcrosslinked hydrogel preferably comprises at least 60% by weight, especially at least 80% by weight, of the mixture. The resin powder generally has a moisture content in the range from 0.1% to 10% by weight and preferably in the range from 1% to 5% by weight.

The resin powder generally has a weight average particle size in the range from 10 to 500 µm, preferably in the range from 15 to 300 µm and more preferably in the range from 20 to 150 µm. In one preferred embodiment of the present invention, the resin powder is finely divided recyclate from the ongoing polymerization process. The resin powder preferably has a weight average particle size of less than 200 µm, in particular of less than 150 µm. In general, at least 90% by weight of the particles of the resin powder have a particle size of less than 150 µm; preferably, at least 90% by weight of the particles have a particle size of less than 100 µm.

In a further embodiment of the present invention, the resin powder is polymeric material taken from a different manufacturing process and having at least 90% by weight of its particles having a particle size in the range from 200 to 700 µm.

The fillers used according to the present invention comprise finely divided, pulverulent or fibrous materials which are inert under the production conditions of the water-absorbing resins and may be organic or inorganic in nature.

Examples of such fillers are inorganic particles, such as clay minerals, polysilicas, zeolites, activated carbon, water-insoluble metal phosphates, metal oxides, metal carbonates and mixtures thereof.

Preferred clay minerals are in particular silicates having a band, chain or sheet structure, examples being montmorillonite, kaolin, bentonites, talc, fuller's earths.

Suitable polysilicas are precipitated silicas or fumed silicas. These are commercially available under the name of AEROSIL® (fumed silicas) or Silica FK, Sipernat®, Wessalon® (precipitated silica). The use of precipitated silicas is particularly preferred.

It is also possible to use water-insoluble metal phosphates, for example of the general formula $M_4P_2O_7$, $M_2HPO_4$, $M_3PO_4$; M=calcium, magnesium, strontium, barium, zinc, iron, aluminum, titanium, zirconium, hafnium, tin, cerium, scandium, yttrium or lanthanum or mixtures thereof. Useful water-insoluble metal phosphates also include those phosphates which may be regarded as "phosphates" in an industrial sense, and may be considered for example as mixed phosphate oxides, phosphate hydroxides, phosphate silicates, phosphate fluorides or the like.

Useful water-insoluble metal oxides include finely divided silicon dioxide, titanium dioxide, zirconium dioxide, magnesium oxide, aluminum oxide and iron oxide; and calcium carbonate can be used as water-insoluble metal carbonate.

Glass microbeads, sand or glass fibers can also be used.

Useful organic-based inert particulate material includes for example polyalkyl methacrylates, polyvinyl chloride, cellulose, microcrystalline cellulose, guar bean flour, tara bean flour, carob bean flour, all kinds of starches, synthetic and natural fibers.

The fillers used according to the present invention generally have an average particle size in the range of up to 500 µm, for example in the range from 10 to 500 µm, preferably in the range from 15 to 300 µm, more preferably in the range from 20 to 150 µm, measured using laser diffraction for example.

In the process of the present invention, the total amount of additive added is in the range from 5% to 50% by weight and preferably in the range from 15% to 40% by weight, based on the monomers (hydrophilic monomer and crosslinker) present in the monomer solution employed before the polymerization is initiated. The weight ratio of the first portion to the second portion of the additive is in the range from 10:1 to 1:5 and preferably in the range from 5:1 to 1:1.

The fraction of resin powder in the total amount of additive added is preferably at least 45% by weight, for example in the range from 50% to 95% by weight and especially in the range from 75% to 90% by weight. In certain embodiments, the additive consists exclusively of resin powder.

In a preferred embodiment of the process according to the present invention, the first portion of the additive comprises resin powder only and the second portion of the additive comprises a mixture of resin powder and fillers, in particular inorganic particles.

In another preferred embodiment of the process according to the present invention, not only the first portion of the additive but also the second portion of the additive comprise a mixture of resin powder and fillers, in particular inorganic particles.

The process of the present invention may be carried out not only as a continuous operation but also as a batch operation. The polymerization is preferably effected under the constant action of shearing forces to comix the reaction mixture and continuously comminute the gel formed. The shearing forces also ensure good admixing of the additive. Kneaders, in which in general counterrotatory stirring shafts create shearing forces, are suitable reaction apparatus.

In batch operation, the stages described above are traversed at successive times. In batch operation, the residence time in the reactor is defined as the time from mixing of monomer solution and initiator to the attainment of a 98% conversion. The first and second portions of the additive are admixed to the reaction mixture at different times. For instance, the first addition can be to the monomer solution, followed by the second addition after a sufficient time difference in which conversion has progressed to such an extent that the initially obtained highly viscous gel crumbles into granules.

In the continuous process, the first and second portions of the additive are added at different geometric sites. Typically, a reactor system for the continuous polymerization process comprises at least three reaction zones, namely a first or initiation zone, a second or gel phase zone and a third or granulation zone (cf. WO 03/22896). The first zone comprises either a unitary solvent phase or a biphasic low-viscosity system composed of liquid monomer solution and partially polymerized polymer. The residence time in the first zone amounts to 20% to 50% of the overall residence time in all reaction zones. The subsequent second zone contains the highly viscous polymer gel; the conversion reached at the end of the second zone is in the range from 50% to 75%. The residence time in the second zone amounts to 20% to 50% of the overall residence time in all reaction zones. The boundary to the third reaction zone is associated with a transition from a highly viscous gel into a relatively free-flowing granular gel. At this point, the polymerization process is almost complete and the conversion at the point of exit of the polymer gel from the reactor is at least 98%, but can be up to 99.9% or be even higher. The residence time in the third zone amounts to 10% to 60% of the overall residence time in all reaction zones. The overall residence time in all reaction zones is 100%. The three reaction zones can be situated in one reactor system, or alternatively the first zone can be accommodated in a separate reactor and the second and third zones in a further reactor.

There is a direct correlation between the monomer conversion at any one point in the reactor and the residence time in the reactor. The residence time is in turn determined by the reactor throughput, the fill level of the reactor and also the polymerization kinetics, in particular the gel point, i.e., the monomer conversion at which the liquid monomer phase transitions into the gel phase.

In accordance with the above definition, the first addition of the additive can be into the initiation zone. The further addition of the additive preferably takes place at the transition from the second to the third zone or into the third zone.

ORP Conti two-shaft extruders from List AG, Arisdorf, Switzerland, will be found advantageous for carrying out the process of the present invention. A housing which is a figure of eight lying on its side in cross section accommodates two parallel, overlapping rotary stirring shafts, which are known as main shaft and cleaning shaft. Kneading elements on the main and cleaning shafts produce a gentle mixing and kneading effect. The main shaft is equipped with radially disposed disk-shaped elements which are connected at the circumference by mixing and kneading bars. The parallel cleaning shaft within the housing is equipped with rotary kneading frames whose construction and circumferential speed are such that they engage between the disk-shaped elements of the main shaft and continuously clean the areas thereof. The outermost, axially parallel part of the frame cleans the inside surface of the housing and the main shaft, but also combines with the kneading bar of the main shaft to form a very effective mixing and kneading element. The inclined attitude of the kneading bars and of the frames produces, as with a screw, an axial force which transports the product through the machine.

In one preferred embodiment of the process of the present invention, an aqueous solution of monomer is fed to the input end of a continuous operated reactor having at least two axially parallel rotating shafts, in which the reaction mixture is transported from the input end of the reactor to its output end as the polymerization progresses, and the first and second portions of the additive are admixed at two locations of the reactor which are spaced apart in the direction of transport of the monomer solution.

The process of the present invention proceeds from an aqueous monomer solution comprising at least one hydrophilic monomer and at least one crosslinker. Suitable hydrophilic monomers are known to one skilled in the art, examples being polymerizable acids, such as acrylic acid, methacrylic acid, vinylsulfonic acid, styrenesulfonic acid, vinylphosphonic acid, maleic acid including the anhydride thereof, fumaric acid, itaconic acid, 2-acrylamido-2-methylpropanesulfonic acid, 2-acrylamido-2-methylpropanephosphonic acid and also their amides, hydroxyalkyl esters and amino- or ammonio-containing esters and amides and also the alkali metal and/or ammonium salts of the monomers comprising acid groups. Water-soluble N-vinylamides such as N-vinylformamide or diallyldimethylammonium chloride are also suitable.

Preferred hydrophilic monomers are monomers bearing acid groups, preferably partially neutralized; that is, from 35% to 100%, e.g., from 50% to 100%, preferably from 60% to 90% or 55 to 75, of the acid groups are neutralized.

Particularly preferred hydrophilic monomers are acrylic acid and methacrylic acid and also their alkali metal or ammonium salts, examples being sodium acrylate, potassium acrylate or ammonium acrylate. In particularly preferred embodiments, the hydrophilic monomer comprises partially neutralized acrylic acid.

Suitable grafting bases can be of natural or synthetic origin. Examples are starch, cellulose or cellulose derivatives and also other polysaccharides and oligosaccharides, polyvinyl alcohol, polyalkylene oxides, in particular polyethylene oxides and polypropylene oxides, polyamines, polyamides and also hydrophilic polyesters.

Useful crosslinkers include in particular compounds having 2, 3, 4 or 5 ethylenically unsaturated double bonds in the molecule, which may also be conjugated with each other. Examples of suitable crosslinkers are N,N'-methylenebisacrylamide, polyethylene glycol diacrylates and polyethylene glycol dimethacrylates, each derived from polyethylene glycols having a number average molecular weight in the range from 106 to 8500 and preferably in the range from 400 to 2000, trimethylolpropane triacrylate, trimethylolpropane trimethacrylate, ethylene glycol diacrylate, ethylene glycol dimethacrylate, propylene glycol diacrylate, propylene glycol dimethacrylate, butanediol acrylate, butanediol dimethacrylate, hexanediol diacrylate, hexanediol dimethacrylate, diethylene glycol diacrylate, diethylene glycol dimethacrylate, triethylene glycol diacrylate, triethylene glycol dimethacrylate, dipropylene glycol diacrylate, dipropylglycyl dimethacrylate, tripropylene glycol diacrylate, tripropylene glycol dimethacrylate, allyl methacrylate, diacrylates and dimethacrylates of block copolymers of ethylene oxide and propylene oxide, polyhydric alcohols, such as glycerol, trimethylolpropane, pentaerythritol or dipentaerythritol, doubly, triply, quadruply or pentuply esterified with acrylic acid or methacrylic acid, esters of monoethylenically unsaturated carboxylic acids with ethylenically unsaturated alcohols such as allyl alcohol, cyclohexanol and dicyclopentyl alcohol, for example allyl acrylate and allyl methacrylate, also triallylamine, dialkyldiallylammonium halides such as dimethyldiallylammonium chloride and diethyldiallylammonium chloride, tetraallylethylenediamine, divinylbenzene, diallyl phthalate, polyethylene glycol divinyl ethers of polyethylene glycols having a number average molecular weight in the range from 106 to 4000, trimethylolpropane diallyl ether, butanediol divinyl ether, pentaerythritol triallyl ether, reaction products of 1 mol of ethylene glycol diglycidyl ether or polyethylene glycol diglycidyl ether with 2 mol of pentaerythritol triallyl ether or allyl alcohol, and divinylethylene urea.

Nonvinylic crosslinkers can also be used. They have at least two functional groups capable of reacting with carboxyl groups of the polymer, such as glycerol, polyglycols, ethylene glycol, diglycidyl ethers and diamines. Examples of such crosslinkers are to be found in U.S. Pat. Nos. 4,666,983, 4,734,478 and 5,145,906. Preferred nonvinylic crosslinkers are hexanediamine, glycerol, ethylene glycol diglycidyl ether, ethylene glycol diacetate, polyethylene glycol 400, polyethylene glycol 600 and polyethylene glycol 1000. Polyethylene glycol 400 and polyethylene glycol 600 are the most preferred nonvinylic crosslinkers.

Dimodal crosslinkers can likewise be used. These are compounds which have at least one ethylenically unsaturated double bond and at least one carboxyl-reactive functional group. To distinguish them from normal crosslinkers having a plurality of ethylenically unsaturated double bonds, these compounds are referred to as "dimodal crosslinkers" because they utilize two different mechanisms of crosslinking. Suitable dimodal crosslinkers comprise hydroxyethyl (meth)acrylate, polyethylene glycol monomethacrylate, glycidyl methacrylate and allyl glycidyl ether. The compounds described in U.S. Pat. Nos. 4,962,172 and 5,147,956 are useful as dimodal crosslinkers. Preferred dimodal crosslinkers are hydroxyethyl (meth)acrylate, polyethylene glycol 400 monomethacrylate, glycidyl methacrylate. Hydroxyethyl (meth)acrylate is the most preferred dimodal crosslinker.

The amount of crosslinker used is typically in the range from 0.01% to 5% by weight, usually in the range from 0.1% to 1.2% by weight and especially in the range from 0.4% to 0.9% by weight, based on the hydrophilic monomer.

The polymerization reaction can be carried out in the temperature range from 20 to 150° C. and preferably from 30 to 100° C. not only at atmospheric pressure but also under elevated or reduced pressure. As usual, the polymerization can also be carried out in a protective gas atmosphere, preferably under nitrogen and/or water vapor. The polymerization can be initiated using high energy electromagnetic rays or the customary chemical polymerization initiators, examples being organic peroxides, such as benzoyl peroxide, tert-butyl hydroperoxide, methyl ethyl ketone peroxide, cumene hydroperoxide, azo compounds such as azobisisobutyronitrile and also inorganic peroxo compounds such as $(NH_4)_2S_2O_8$ or $K_2S_2O_8$ or $H_2O_2$. Preferred redox initiator systems are water-soluble and comprise as oxidizing component at least one of the peroxo compounds indicated above and as reducing component for example ascorbic acid, glucose, sorbose, an ammonium or alkali metal sulfite, hydrogensulfite, thiosulfate, hyposulfite, pyrosulfite or sulfide, metal salts such as iron(II) ions or sodium hydroxymethylsulfoxylate. Ascorbic acid or sodium sulfite is preferably as reducing component of the redox initiator system.

The gel material is dried in a conventional manner, for example using a belt or drum dryer or fluid-bed dryer, until the residual moisture content is preferably below 10% by weight and in particular between 1% to 5% by weight. The dried hydrogel is then ground and sieved, useful grinding apparatus typically including roll mills, pin mills, swing mills, hammer mills or cutting mills. Particle fractions having a particle size less than a predetermined minimum particle size can be recycled as and recycled as resin powder into the process of the present invention. Typically, the particles contemplated for further processing have a particle size in the range from 10 to 1000 μm and usually in the range from 100 to 850 μm.

In one preferred embodiment of the present invention, the absorption properties of the water-absorbing resins of the present invention are further improved by a subsequent surface postcrosslinking. Surface postcrosslinking increases the near-surface crosslink density of the resin particles, raising the absorption under pressure to a higher level.

Surface postcrosslinking is effected in a conventional manner with the as-obtained, dried, preferably ground and sieved-off polymeric particles. Surface crosslinking utilizes compounds having at least two functional groups capable of reacting with the functional groups, preferably the carboxyl groups of the resin by crosslinking (postcrosslinking agents). For this, the postcrosslinking agents are applied to the surface of the polymer particles, preferably in the form of a solution. The solution may comprise water-miscible organic solvents. Suitable solvents are for example $C_1$-$C_4$-alcohols such as methanol, ethanol, isopropanol, propylene glycol, ethylene glycol or ketones such as acetone and methyl ethyl ketone. Particular preference is given to aqueous solutions of such alcohols in which the alcohol content of the solution is in the range from 10% to 90% by weight, more preferably between 25% to 70% by weight and especially between 30% to 50% by weight. The surface postcrosslinker is used in an amount of 0.01% to 1% by weight, based on the polymer used, and the crosslinker solution itself is used in an amount of 1% to 20% by weight and preferably 3% to 15% by weight, based on the resin used.

Examples of suitable postcrosslinking agents are:

di- or polyglycidyl compounds such as phosphonic acid diglycidyl ether or ethylene glycol diglycidyl ether, bischlorohydrin ethers of polyalkylene glycols; alkoxysilyl compounds; polyaziridines, compounds comprising aziridine units and based on polyethers or substituted hydrocarbons, for example bis-N-aziridinomethane; polyamines or polyamidoamines and also their reaction products with epichlorohydrin; diols and polyols, for example ethylene glycol, 1,2-propanediol, 1,4-butanediol, glycerol, methyltriglycol, trimethylolethane, trimethylolpropane, polyethylene glycols having an average molecular weight MW in the range from 200 to 10 000, di- and polyglycerol, pentaerythritol, sorbitol, the ethoxylates of these polyols and also their esters with carboxylic acids or with carbonic acid such as ethylene carbonate or propylene carbonate; carbonic acid derivatives such as urea, thiourea, guanidine, dicyandiamide, 2-oxazolidinone and its derivatives, bisoxazoline, polyoxazolines, di- and polyisocyanates; di- and poly-N-methylol compounds such as for example methylenebis(N-methylolmethacrylamide) or melamine-formaldehyde resins; compounds having two or more blocked isocyanate groups such as for example trimethylhexamethylene diisocyanate blocked with 2,2,3,6-tetramethyl-4-piperidinone; and 2-oxazolidones, such as 2-oxazolidinone or N-hydroxyethyl-2-oxazolidinone, morpholine-2,3-diones, such as N-2-hydroxyethylmorpholine-2,3-dione, N-methylmorpholine-2,3-dione, N-ethylmorpholine-2,3-dione and/or N-tert-butylmorpholine-2,3-dione, 2-oxotetrahydro-1,3-oxazine, N-acyl-2-oxazolidones, such as N-acetyl-2-oxazolidone, bicyclic amide acetals, such as 5-methyl-1-aza-4,6-dioxabicyclo[3.3.0]octane, 1-aza-4,6-dioxabicyclo[3.3.0]octane and/or 5-isopropyl-1-aza-4,6-dioxabicyclo[3.3.0]octane, and/or bis- and poly-2-oxazolidinones.

If necessary, acidic catalysts such as p-toluenesulfonic acid, phosphoric acid, boric acid or ammonium dihydrogenphosphate can be added.

The crosslinker solution is preferably applied by spraying with a solution of the crosslinker by means of conventional reaction mixers or mixing and drying ranges such as for example Patterson-Kelly mixers, DRAIS turbulence mixers, Lödige mixers, screw mixers, pan mixers, fluidized bed mixers or Schugi/Flexo Mix. After spraying with the crosslinker solution the resin is generally subjected to a thermal treatment step, preferably in a downstream dryer and at a temperature between 80 and 230° C., more preferably 80 to 190° C., and most preferably between 100 and 160° C. or 170 to 190° C. and for a period in the range from 5 minutes to 6 hours, preferably 10 minutes to 2 hours and more preferably 10 minutes to 1 hour, in which not only scission products but also solvent fractions can be removed. But the drying can also take place in the mixer itself, for example by heating the jacket or blowing a preheated carrier gas into the mixer. After the heat treatment, the resin can be sieved again and particles below a predetermined minimum particle size can be separated off and recycled as resin powder into the process of the present invention.

The water-absorbing resin may be subjected to further optional modifications. In one embodiment of the present invention, the hydrophilicity of the particle surface of the polymers is modified through formation of complexes. The complexes are formed on the outer shell of the hydrogel particles by spraying with solutions of di- or more highly valent metal salt solutions, and the metal cations can react with the acid groups of the polymer to form complexes. Examples of di- or more highly valent metal cations are $Mg^{2+}$, $Ca^{2+}$, $Al^{3+}$, $Sc^{3+}$, $Ti^+$, $Mn^{2+}$, $Fe^{2+/3+}$, $Co^{2+}$, $Ni^{2+}$, $Cu^{+/2+}$, $Zn^{2+}$, $Y^{3+}$, $Zr^{4+}$, $Ag^+$, $La^{3+}$, $Ce^{4+}$, $Hf^{4+}$, and $Au^{+/3+}$, preferred metal cations are $Mg^{2+}$, $Ca^{2+}$, $Al^{3+}$, $Ti^{4+}$, $Zr^{4+}$ and $La^{3+}$, and particularly preferred metal cations are $Al^{3+}$, $Ti^{4+}$ and $Zr^{4+}$. The metal cations can be used not only alone but also mixed with each other. Of the metal cations specified, all metal salts can be used that possess sufficient solubility in the solvent to be used. Metal salts with weakly complexing anions such as for example chloride, nitrate and sulfate are particularly suitable. Useful solvents for the metal salts include water, alcohols, DMF, DMSO and also mixtures thereof. Particular preference is given to water and water/alcohol mixtures such as for example water/methanol and water/1,2-propanediol. The spraying with the salt solution can take place not only before but also after the surface postcrosslinking of the particles. In a particularly preferred process, the spraying with the salt solution takes place in the same step as the spraying with the crosslinker solution, and both solutions can be sprayed separately in succession or simultaneously through two or more nozzles, or a combined crosslinker and salt solution can be sprayed through one nozzle. At the time of being sprayed with the crosslinker solution and/or the solution of the di- or more highly valent metal salt, the water-absorbing resin may have a temperature in the range from 20 to 90° C. and preferably in the range from 25 to 60° C., for example about 40° C.

Optionally, the hydrogel-shaping polymers can be further modified by admixture of finely divided inorganic solids, for example silica, aluminum oxide, titanium dioxide and iron (II) oxide, which further enhances the effects of the surface aftertreatment. It is particularly preferred to admix hydrophilic silica or an alumina having an average size for the primary particles in the range from 4 to 50 nm and a specific surface area of 50-450 $m^2$ g. The admixing of finely divided inorganic solids preferably takes place after the surface modification through crosslinking/complexation, but can also be carried out before or during these surface modifications.

The present invention further provides for the use of the above-mentioned hydrogel-forming polymers in hygiene articles. Typical hygiene articles comprise:
(A) a fluid-pervious topsheet,
(B) a fluid-impervious backsheet,
(C) a core positioned between (A) and (B) and consisting of a mixture of the water-absorbing resin obtained in accordance with the present invention and hydrophilic fiber material,
(D) if appropriate a tissue layer positioned directly above and below said core (C), and
(E) if appropriate an acquisition layer positioned between (A) and (C).

The examples which follow and the accompanying FIGURE illustrate the invention in more detail.

FIG. 1 shows the particle size distribution of the particle fraction <850 μm of polymers produced according to the present invention and of comparative polymers, following coarse comminution.

EXAMPLES

Test Methods

Centrifuge Retention Capacity (CRC)

Centrifuge Retention Capacity of the water-absorbing polymeric particles is determined in accordance with the EDANA (European Disposables and Nonwovens Association) recommended test method No. 441.2-02 "Centrifuge retention capacity".

Absorbency Under Load AUL 0.7 psi (4826.5 Pa)

The absorbency under pressure of the water-absorbing polymeric particles is determined in accordance with the EDANA (European Disposables and Nonwovens Association) recommended test method No. 442.2-02 "Absorption under pressure", except that the total weight of plastic plunger+metal weight is not 574 g+/−5 g (21.0 $g/cm^2$=0.30 psi), as described in the method, but 1345 g+/−1 g (49.2 $g/cm^2$=0.70 psi).

Extractable Fractions

The extractable fractions of the water-absorbing polymeric particles are determined in accordance with the EDANA (European Disposables and Nonwovens Association) recommended test method No. 470.2-02 "Extractables".

Residual Monomer/Residual Crosslinker

The level of residual monomers (acrylic acid) in the water-absorbing polymers is determined in accordance with the EDANA (European Disposables and Nonwovens Association) recommended test method No. 410.2-02 "Residual monomers".

Residual crosslinker (polyethylene glycol diacrylate) is determined by an HPLC method.

The EDANA test methods are obtainable for example at European Disposables and Nonwovens Association, Avenue Eugene Plasky 157, B-1030 Brussels, Belgium (www.edana.org).

Reference Example 1

Production of a Resin Powder

A 40% by weight aqueous monomer solution of acrylic acid and sodium acrylate corresponding to a 77 mol % degree of neutralization of the acrylic acid was used. The crosslinker used was polyethylene glycol 400 diacrylate (Cray Valley) in an amount of 0.45% by weight, based on acrylic acid. The crosslinker was mixed together with the aqueous monomer solution and this solution was inertized by passing nitrogen into it. To initiate the polymerization, the following system was used: 0.005% by weight of hydrogen peroxide and 0.006% by weight of ascorbic acid and 0.28% by weight of sodium peroxodisulfate, all based on acrylic acid.

The individual components of the initiator and 600 kg/h of monomer/crosslinker solution were metered separately into a kneading reactor (List ORP 250 Contikneter from List, Arisdorf, Switzerland) and mixed therein during addition into the reactor, and the polymerization started speedily during mixing. The gel produced in the kneader by polymerization was continuously discharged. The temperature of the cooling water in the jacket was 40° C. for a total cooling water throughput through the jacket of 12 m$^3$/h. During the polymerization, 14 m$^3$/h of nitrogen were passed through this kneader. The reaction volume was 300 l.

The reaction solution had an inlet temperature of 23.5° C., and the product gel had a discharge temperature of 64.5° C. Maximum product temperatures of less than 80° C. were measured in the reactor. The residence time of the product in the reactor was less than 15 min.

The gel was dried, ground and passed through sieves to obtain a particle size fraction from 100 to 800 µm. The dried polymer had a Centrifuge Retention Capacity CRC of 38.8 g/g. The residual monomer content was 1230 ppm, the residual crosslinker content was about 50 ppm, and extractables were 18%.

The fraction having a size distribution of less than 100 µm was added to the process described in Comparative Example 2 and Example 1, in the manner and amount indicated there.

Comparative Example 2

Reference Example 1 was repeated in a List ORP 6300 Contikneter. The reactor was fed with 17 t/h of monomer solution. The average residence time of the reaction mixture in the reactor was about 14 min. The resin powder of Reference Example 1 was added at a point corresponding to 24% of the overall residence time in the reactor, directly between the stirring and cleaning shafts. The amount of resin powder was 26.8% of the solids content of the monomer used. Major amounts of undesirable gel clumps formed.

The gel was dried, ground and passed through sieves to obtain a particle size fraction from 100 to 800 µm. The dried polymer had a Centrifuge Retention Capacity CRC of 36.2 g/g. The residual monomer content was 950 ppm, the residual crosslinker content was about 40 ppm, and extractables were 15%.

Then, 20 g of polymer (particle size fraction 100-800 µm) were placed as initial charge in a laboratory mixer (Waring mixer) with mixing attachment and dulled mixing blades. With the mixer running at low revs, 1 g of postcrosslinking solution comprising 12 mg of ethylene glycol diglycidyl ether dissolved in a mixture of 33% by weight of 1,2-propylene glycol and 67% by weight of water was added. The moist polymer powder was then removed from the mixer and dried in a Petri dish in a circulating air cabinet at 150 DEG C for 60 minutes. After the coarse fraction (>800 micrometers) had been sieved off, the product obtained was tested for its performance characteristics: CRC: 28 g/g; AUL 0.7 psi: 24.0 g/g.

Example 3

Comparative Example 2 was repeated. The particulate hydrogel-forming polymer material of Comparative Example 1 was added at two points. The total amount of particulate hydrogel-forming polymer material added at the two dosing times was 26.8% of the solids content of the monomer used. The first dosing took place at a point corresponding to 24% of the overall residence time in the reactor, directly between the stirring and cleaning shafts, while the second one took place at a distance at 53% of the overall residence time in the reactor, to the side of the cleaning shaft. The amount added in the course of the second dosing was 4.2% by weight of the solids content of the monomer used. It was noticeable that the amount of gel clumps was appreciably reduced.

The gel was dried, ground and passed through sieves to obtain a particle size fraction from 100 to 800 µm. The dried polymer had a Centrifuge Retention Capacity CRC of 37.5 g/g. The residual monomer content was 300 ppm, the residual crosslinker content was about 20 ppm, and extractables were 10%.

Surface postcrosslinking was carried out similarly to Comparative Example 2. The product obtained had, after the coarse fraction (>800 µm) had been sieved off, the following specifications: CRC: 29 g/g; AUL 0.7 psi: 24.9 g/g.

Reference Example 4

A List ORP 10 laboratory kneader with 5 l stock reservoir container and devolatilizing means (nitrogen) was used. The kneader shell is heatable, the shafts are coolable.

To produce the base polymer, an aqueous monomer solution having a solids content of 38% and a degree of neutralization of 75% was prepared. Batch size was 4500 g. 347.8 g of acrylic acid (100% by weight pure), 444.0 g of water and 3652.0 g of aqueous sodium acrylate solution (37.3% by weight strength) were mixed. This mixture was admixed with 4.17 g of polyethylene glycol 400 diacrylate (Cray Valley) (0.3% by weight based on acrylic acid).

The monomer solution was then inertized with nitrogen in a 5 L feed vessel by stirring for 30 min. During the inertizing operation, the kneader shell was temperature controlled to 40° C. and the kneader shafts were temperature controlled to 25° C. The kneader space was purged with nitrogen.

The inertized monomer solution was then introduced into the kneader and admixed with sodium peroxodisulfate (18.55 g of a 15% by weight aqueous solution; 0.2% by weight based on acrylic acid) and hydrogen peroxide (5.56 g of a 1.25% by weight aqueous solution; 0.005% by weight based on acrylic acid). This mixture was mixed for 2 min and thereafter initiated with ascorbic acid (27.82 g of a 0.5% by weight aqueous solution; 0.01% by weight based on acrylic acid). The speed of the cleaning shaft was set to 50 rpm during the admixing of the hydrogen peroxide and of the sodium peroxodisulfate. Stirring was done at 50 rpm for the first 2 min after initiation and thereafter at 30 rpm. The kneader shell was heated at 80° C. from the time of initiation with ascorbic acid.

The gel obtained was discharged following a reaction or residence time of 15 min (reckoned from initiation) and dried in a circulating air drying cabinet at 160° C. for 1.5 hours. The dried polymer was ground in a Retsch mill (type ZM1 No. 67098) and passed through sieves to obtain a particle size fraction from 150 to 850 μm.

The fraction having a particle size of less than 150 μm was used in Comparative Examples 5, 8 and Examples 6, 7 in the manner and amount stated therein.

The reaction mixture was admixed with a total of 10% by weight of resin powder and 5% by weight of kaolin (based on the solids content of the monomer solution) in Examples and Comparative Examples 5 to 8. The addition took place at one or two dosing points, as indicated hereinbelow. The first addition took place into the monomer solution, prior to initiation; the second addition took place following a residence time of 14 min (corresponding to 93% of the total residence time in the reactor), into the gel-form reaction mixture.

Comparative Example 5

Comparative Example 5 was carried out similarly to Reference Example 4. Following introduction of the monomer solution into the kneader, a powder mixture of 171 g (10% by weight based on the solids content) of resin powder (obtained from Reference Example 4) and 85.5 g (5% by weight based on the solids content) of kaolin (CAS No. 1332-58-7; J.M. Huber Corporation Atlanta Ga. 30327 USA Chemtrec No. 800-424-9300 or 703-527-3887) was added to the monomer solution.

Example 6

Example 6 was carried out similarly to Reference Example 4. Following introduction of the monomer solution into the kneader, a powder mixture of 85.5 g (5% by weight based on the solids content) of resin powder (obtained from Reference Example 4) and 85.5 g (5% by weight based on the solids content) of kaolin (see above) was added to the monomer solution. In addition, 85.5 g (5% by weight based on the solids content) of resin powder were introduced into the polymerization reactor 14 min after initiation.

Example 7

Example 7 was carried out similarly to Reference Example 4. Following introduction of the monomer solution into the kneader, 171 g (10% by weight based on the solids content) of resin powder (obtained from Reference Example 4) were added to the monomer solution. In addition, 85.5 g (5% by weight based on the solids content) of kaolin (see above) were introduced into the polymerization reactor 14 min after initiation.

Comparative Example 8

Comparative Example 8 was carried out similarly to Reference Example 4. 14 min after initiation a powder mixture of 171 g (10% by weight based on the solids content) of resin powder (obtained from Reference Example 4) and 85.5 g (5% by weight based on the solids content) of kaolin (see above) was introduced into the polymerization reactor.

The polymers of Examples and Comparative Examples 5 to 8 were ground in a mill (Retsch type ZM1 No. 67098) and passed through sieves to obtain a particle size fraction from 300 to 600 μm. Centrifuge Retention Capacity (CRC) and Extractables (Extr) of the water-absorbing polymers obtained were determined. To preclude distortions due to different degrees of drying, the values found were arithmetically standardized to a moisture content of 0%. The results are reported in the table below.

| Example | 1st addition | 2nd addition | CRC [g/g] | Extr. [%] | CRC/ Extr. |
|---|---|---|---|---|---|
| 5* | 10% resin powder 5% kaolin | — | 34.2 | 8.5 | 4.0 |
| 6 | 5% resin powder 5% kaolin | 5% resin powder | 35.3 | 8.1 | 4.4 |
| 7 | 10% resin powder | 5% kaolin | 31.0 | 6.2 | 5.0 |
| 8* | — | 10% resin powder 5% kaolin | 31.2 | 4.6 | 6.8 |

*Comparative Examples

The CRC/Extr ratio, which serves as a measure of a balance between high retention capacity and low extractables, increases from Comparative Example 5 to Inventive Examples 6 and 7.

To check the quality of incorporation of the additives, some of the dried sample of polymer was coarsely precomminuted in a cutting mill (Retsch type SM1 without sieve insert) at 1430 rpm. 200 g of the precomminuted sample of polymer were weighed into a porcelain mill (capacity about 785 ml, internal diameter 10 cm, internal height 10 cm) and treated with 104 cylindrical ceramic bodies (diameter 12.5 mm, height 12.2 mm, mass 5.15 g) at 80 rpm for 5 min. Particle size distribution was determined subsequently, similarly to EDANA test method No. 420.2-02 "Particle Size Distribution", using the following sieves: 100 μm, 200 μm, 300 μm, 400 μm, 500 μm, 600 μm, 710 μm and 850 μm.

The results are shown in FIG. 1, where the ordinate indicates the fraction in % by weight which the particular particle size class contributes to the totality of the particles (solid squares: Example 5; triangles pointing up: Example 6; diamonds: Example 7; triangles pointing right: Example 8).

Comparative Example 8 is seen to have a particle size distribution maximum at 100 to 200 μm. This is an indication that the agglomerates formed in this example have insufficient mechanical stability and undesirable fines are increasingly generated on exposure to stress. The maximum at 100 to 200 μm indicates that the resin powder was not bound sufficiently firmly into the polymer matrix. The curve of Comparative Example 5 is above the curves of the other examples. Evidently, the polymer formed in this example has altogether an insufficient mechanical stability, which is why particles having a broad particle size spectrum are broken out on exposure to stress.

We claim:

1. A process for producing a water-absorbing resin by polymerization of a reaction mixture comprising at least one hydrophilic monomer and, optionally, at least one crosslinker in a reactor, which comprises admixing the reaction mixture with at least one first portion of a particulate additive before a reaction mixture has reached a residence time of 40% of the overall residence time in the reactor and with at least one second portion of a particulate additive when the reaction mixture has reached a residence time of 45% or more of the overall residence time in the reactor, the additive being selected from the group consisting of water-absorbing resin powders, fillers, and mixtures thereof, a total solids content of monomer and additive being in the range from 30% to 60% by weight, an amount of additive being in the range from 5% to 50% by weight, based on the monomers, and a weight ratio of the first portion to the second portion of the additive being in the range from 10:1 to 1:5.

2. The process according to claim 1 wherein the first portion of the additive is admixed when the reaction mixture has reached a residence time of up to 30% of the overall residence time in the reactor.

3. The process according to claim 1 wherein the second portion of the additive is admixed when the reaction mixture has reached a residence time in the range from 50% to 99% of the overall residence time in the reactor.

4. The process according to claim 1 wherein the resin powder has a weight average particle size of less than 200 μm.

5. The process according to claim 1 wherein the resin powder has a moisture content in the range from 0.1% to 10% by weight.

6. The process according to claim 1 wherein the resin powder comprises a non-surface-postcrosslinked hydrogel, a surface-postcrosslinked hydrogel, or a mixture thereof.

7. The process according claim 1 wherein the amount of additive is in the range from 15% to 40% by weight, based on the monomers.

8. The process according to claim 1 wherein the weight ratio of the first portion to the second portion of the additive is in the range from 5:1 to 1:1.

9. The process according to claim 1 wherein the fillers are inorganic particles.

10. The process according to claim 9 wherein the inorganic particles are selected from clay minerals, polysilicas, zeolites, activated carbon, water-insoluble metal phosphates, metal oxides, metal carbonates, and mixtures thereof.

11. The process according to claim 1 wherein the fillers are organic particles.

12. The process according to claim 1 wherein the fillers have an average particle size in the range from 10 to 500 μm.

13. The process according to claim 1 wherein the first portion of the additive comprises resin powder only and the second portion of the additive comprises a mixture of resin powder and fillers.

14. The process according to claim 1 wherein the reaction mixture comprises 0.01% to 5% by weight of a crosslinker, based on the hydrophilic monomer.

15. The process according to claim 1 wherein the hydrophilic monomer comprises partially neutralized acrylic acid.

* * * * *